Jan. 30, 1934.   D. PAPAEFTHEMEOU   1,945,374
PISTON ASSEMBLY
Filed Sept. 13, 1932
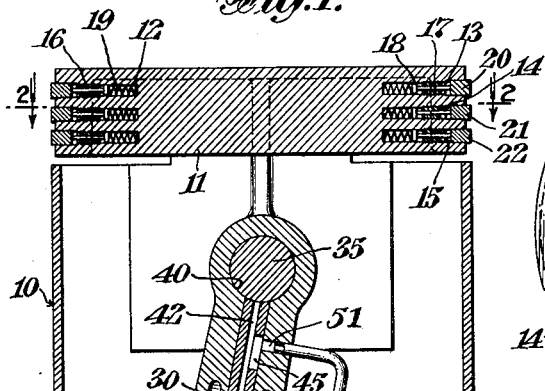
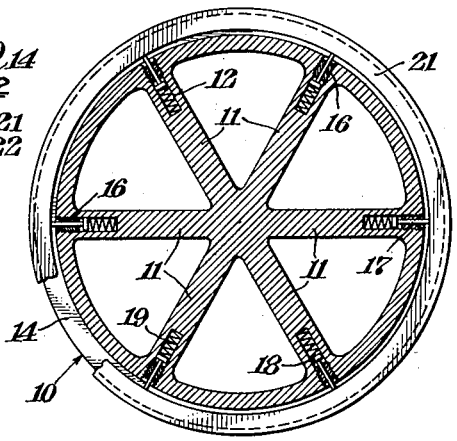
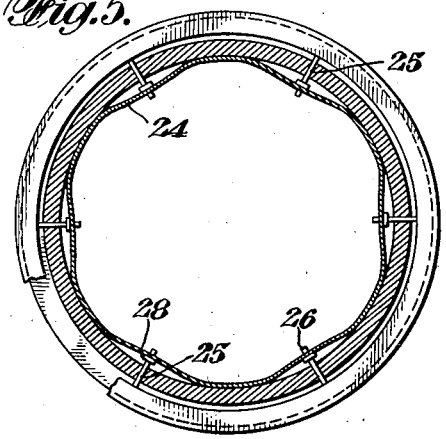
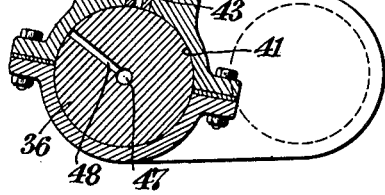
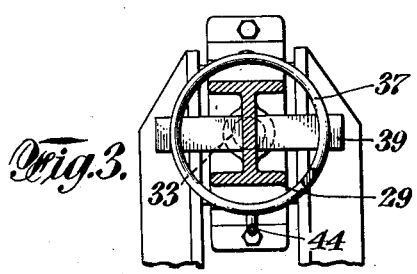
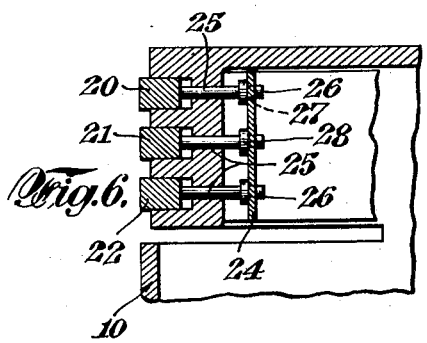
INVENTOR
DEMETRIOS PAPAEFTHEMEOU
BY
ATTORNEY Patented Jan. 30, 1934

1,945,374

UNITED STATES PATENT OFFICE 1,945,374

PISTON ASSEMBLY

Demetrios Papaefthemeou, Richmond, N. Y.

Application September 13, 1932
Serial No. 632,897

3 Claims. (Cl. 309—42)

This invention relates to piston assemblies in internal combustion engines, and particularly to a self-adjusting arrangement of piston rings and connecting rod bearings.

The main object of my invention is to provide against knocking of piston assembly parts and also against what is commonly known as piston side slap, which are frequently caused by excessive play between the connecting rod bearings and the wrist pin and crank shaft, respectively, and by loose piston rings. I accomplish this by having movable pins or pushers in yieldable engagement with the piston rings in one case, and with the wrist pin and crank shaft surfaces in the other case,—so that any play due to wear will be eliminated by this self-adjusting means.

It is a common occurrence for a piston ring, or the usual flat spring positioned inside of one of the grooves to yieldably actuate the piston ring, to become heated up due to high temperatures prevailing around the piston; and it is known that because of such repeated heatings, the ring or spring therein will lose its resiliency, resulting in oil leaks past the rings, and loss of compression. I use in one form of my invention a plurality of radially disposed helical springs to actuate the rings outwardly, these springs being positioned and extending within the interior of the piston so that the lubricating oil splashing up therein will serve to cool the springs and give it greater useful life.

It also frequently happens, in the usual design of piston rings, that the entire circumferential surface of the ring is not in contact with the cylinder wall, the contacting being at only a few points. My invention provides a plurality of springs which engage the piston rings at spaced intervals about the circumference thereof to yieldably actuate them against the cylinder walls, causing complete surface contacting of the rings with the interior cylinder walls. This obviously eliminates the loss of compression and the leakage of oil which are present in the case of loosely fitted piston rings; and it also prevents the passage therepast of carbon particles which embed themselves into the lateral surface of the piston beneath the rings, to cause a souring of the cylinder walls.

In designing pistons, it has heretofore been necessary to make the top of a piston relatively heavy so as to provide sufficient heat transmitting material from the piston through the piston rings to the cylinder walls. With my design, the piston top portion can be made of relatively thin material, as the piston of my invention contains underneath the said top portion and integral therewith, a plurality of radially disposed ribs, which permit better conduction of heat from the piston through the rings to the cylinder wall, as well as greater dissipation of heat from the piston to the atmosphere within it.

Other objects, features and advantages will appear from the drawing and the description hereinafter given.

Referring to the drawing,

Figure 1 is a sectional side view of the piston assembly constituting my invention.

Figure 2 is a sectional plan of Figure 1 taken along line 2—2.

Figure 3 is a section of Figure 1 taken along line 3—3.

Figure 4 is an enlarged fragmentary section showing the arrangement of a yieldably actuated pusher rod and piston ring.

Figure 5 is a sectional plan of the piston proper showing a modification of my invention, and Figure 6 is a fragmentary sectional elevation of Figure 5.

The piston 10 contains integrally therewith the radially disposed ribs 11, each having extending therein the holes or recesses 12 which communicate with the grooves 13, 14 and 15. Within these holes are the bushings 16, preferably in threaded engagement therewith, although they may be secured in place by a force fit. Extending through said bushings are the stems of the pushers 17, each of which has an expanded portion 18 in abutment with the ends of the said springs 19 within said holes, the outer ends of the pusher rods being in engagement with the piston rings 20, 21 and 22.

In the manufacture of this device, it is advisable to drill the said holes 12 through the blank lateral surface of the piston to correspond with each of the said ribs, and then fit the said bushings 16 into each of said holes,—the grooves 13, 14 and 15 for the piston rings being formed after the bushings are inserted. It is also advisable to provide each bushing with a slot 23 which is adaptable to receive a screw driver for removing these bushings and the pusher rods 17 from the piston.

The size of the springs 19 are so designed that the tension will force the piston rings with predetermined force against the cylinder walls. As these springs are equally distributed around the circumference of the piston there will be an equal and complete contacting of the ring throughout its circumference. It should be noted that every pusher rod will remain in place after the piston ring is removed due to the fact that the said expanded portion 18 serves to retain it in place,— as well as to limit its outward movement.

It will be seen that the radial ribs 11 present a relatively large exposed surface, permitting a greater dissipation of heat than is possible with the usual flat underside of the piston. This feature, together with the cooling effect produced by the splashing of the relatively cool oil against said surface serves to keep the springs 19 at a sufficiently low temperature to insure a long useful life for the springs. Although the ribs are shown to be radially disposed, they may be, within the scope of the invention, differently arranged, such as transversely or otherwise.

A modification of this feature of my invention is shown in Figures 5 and 6 which show a flat annular spring 24 inserted within the interior of the piston to yieldably actuate a plurality of equally spaced pusher rods 25 outwardly against the piston rings. The distance the rods 25 extend into the piston is predetermined in accordance with the desired force against the piston rings. The innermost terminal portions 26 of the rods extend into the holes 27 in the spring 24, and serve to hold this spring in place. The expanded portions 28 serve as an abutment for the spring 24 as well as a means of limiting the outward movement of the pushers.

To provide against excessive play of the connecting rod 29 at the wrist pin and crank shaft bearing surfaces, and particularly to eliminate the usual knock due to a worn out bearing, when the engine slows down or when the gas feed is diminished, the arrangement shown in Figure 1 is employed. Here the connecting rod contains two longitudinal holes 30 and 31 therein, in which are positioned the two pusher rods 32 and 33, the former having its upper end in frictional engagement with the wrist pin 35 and the latter having its lower end engaging the crank shaft 36. The helical spring 37 is in constant abutment with the transverse bars 38 and 39 attached to the pusher rods 32 and 33 respectively and serves to actuate these rods in opposite directions and yieldably hold them against the wrist pin and crank shaft respectively, so that in the event of excessive wear of the bearings 40 and 41, these parts will be yieldably held in operative contact at all times. The said pusher rods contain oil holes 42 and 43 therein, and the pipe 44 communicates with these holes by having its ends terminate in the holes 51 and 52 which lead into the apertures 45 and 46. Oil entering the central hole 47 in the crank shaft will be forced upwardly through the radial channel 48 into the hole 43 during each revolution of the crank shaft, and thence to the wrist pin bearing through the pipe 44. The connecting rod contains a scoop 49 which communicates with the aperture 50 and the oil hole 43, so that oil entering said scoop through the splash system will lubricate the bottom end of the pusher rod 33.

What I claim is:

1. In a piston assembly, a groove on the lateral surface of the piston, a piston ring therein, a plurality of spaced holes circumferentially disposed about the lateral surface of the piston and extending from said groove inwardly and radially into the body of the piston a distance less than the radius of the piston, a bushing removably secured within each of said holes and longitudinally adjustable therein, a pusher rod movable within each of said holes and provided with an expanded portion abuttable with the inner end of the bushing for limiting the outward movement of the pusher rod, the stem of said rod extending through said bushing for engagement with the inner surface of the piston ring, and a helical spring in each of said holes behind and in constant engagement with the rear of said expanded portion to yieldably hold the outer end of the pusher rod against the piston ring.

2. In a piston assembly, a piston having the underside of its top portion provided with a plurality of radially disposed ribs integral with said top portion and the lateral wall of the piston, a plurality of grooves on the lateral surface of the piston having piston rings therein, a plurality of holes in the piston wall spaced to correspond with the junctures of said ribs and the piston wall, said holes extending inwardly from said grooves into the body of the ribs a distance less than the radius of the piston, a pusher rod in each of said holes having its outer end engageable with the inner surface of one of said rings and having its inner portion provided with a collar, means movably positioned within said holes and coacting with the collars for adjustably limiting the outward movement of the pusher rods, and a spring within each of said holes and behind and in constant engagement with said collar to yieldably hold the outer end of the pusher rod against the piston ring.

3. In a piston assembly, a plurality of radially disposed ribs integral with the underside of the top portion of the piston and the lateral wall thereof, each of said ribs having therein in longitudinal alignment a plurality of holes to correspond with the number of rings on the piston, each of said holes communicating with a groove on the piston, a plurality of bushings removably and adjustably secured within said holes and extending inwardly from the grooves a distance less than the length of said holes, a pusher rod in each of said holes having a stem extending through said bushings into one of said grooves and having the inner portion thereof provided with a collar abuttable with the inner end of the bushing for adjustably limiting the outward movement of the pusher rod, and a spring within each hole and behind and in constant engagement with said collar for yieldably actuating the pusher rod outwardly against the piston ring.

DEMETRIOS PAPAEFTHEMEOU.